United States Patent [19]

Waldecker

[11] Patent Number: 4,462,907

[45] Date of Patent: Jul. 31, 1984

[54] CENTRIFUGAL, MAGNETIC AND SCREENING SEPARATOR

[76] Inventor: Donald E. Waldecker, 113 Gordon Rd., Falls Church, Va. 22046

[21] Appl. No.: 426,872

[22] Filed: Sep. 29, 1982

[51] Int. Cl.³ .................... B01D 35/06; B01D 45/12
[52] U.S. Cl. ................................. 210/223; 55/100; 209/224
[58] Field of Search ............ 210/222, 223, 243, 512.1, 210/304, 374, 695; 209/223, 224, 39, 40; 55/100

[56] References Cited

FOREIGN PATENT DOCUMENTS 1160130 12/1963 Fed. Rep. of Germany .
581994 12/1972 U.S.S.R. .

Primary Examiner—Frank Sever
Attorney, Agent, or Firm—Glenn E. Wise

[57] ABSTRACT

An apparatus including centrifugal, magnetic and screening components for separating contaminating solid magnetic and/or non-magnetic particles from a fluid. The centrifugal, magnetic and screening components, during the operation of the apparatus, are supported by and enclosed within a housing. The housing is readily openable to provide access to all of the components for cleaning and/or repair and/or replacement, and the components are so related that fluid "starving" of a system in which the apparatus is in series with other components is substantially prevented.

11 Claims, 11 Drawing Figures

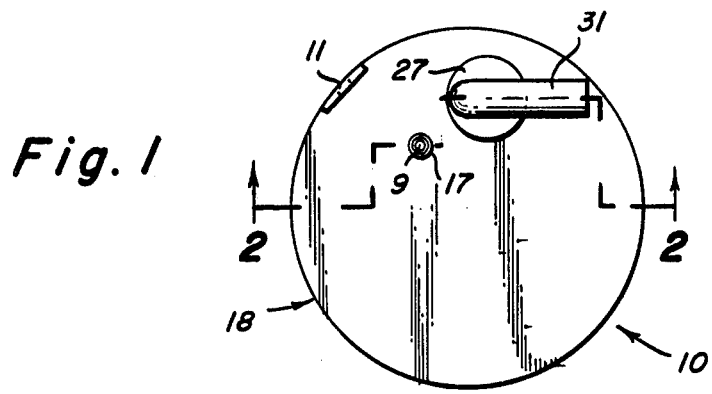
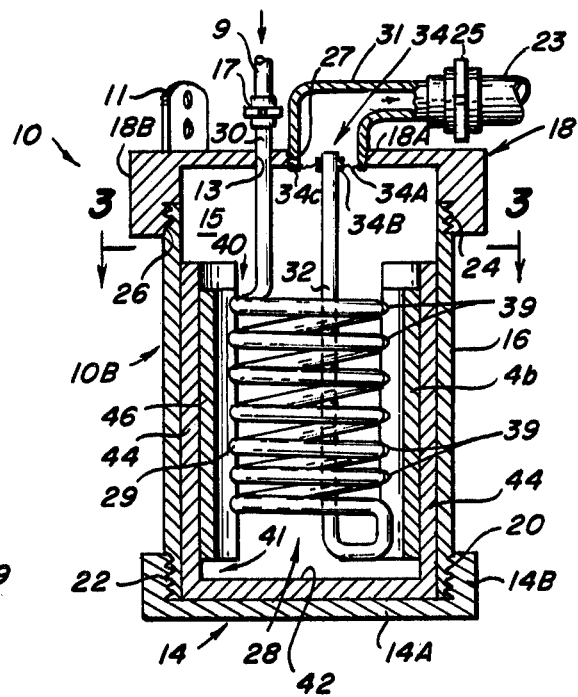
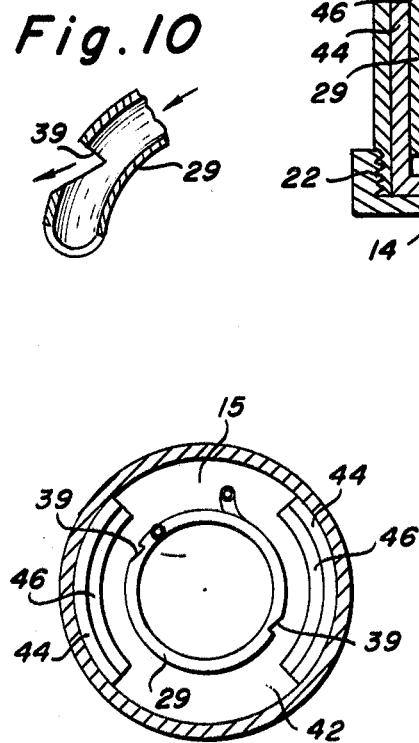
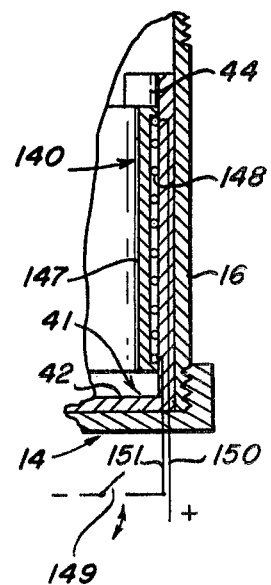
Fig. 1
Fig. 2
Fig. 10
Fig. 3
Fig. 4

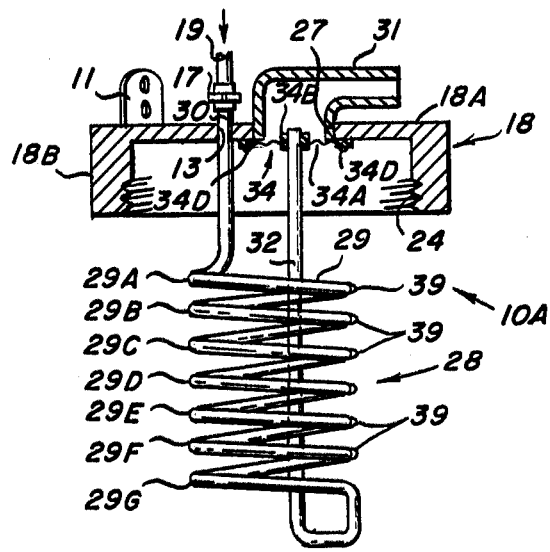
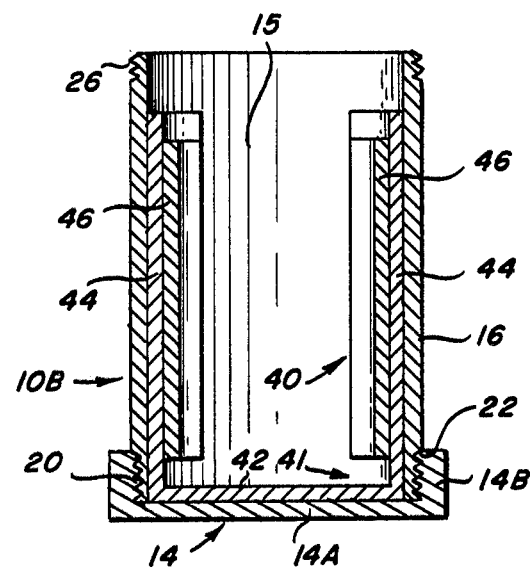
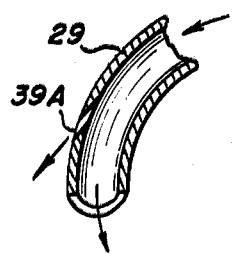
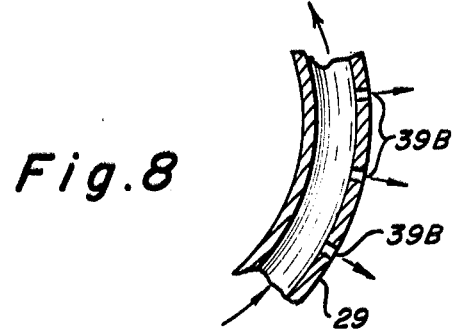
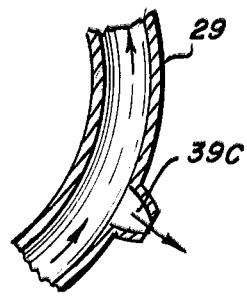
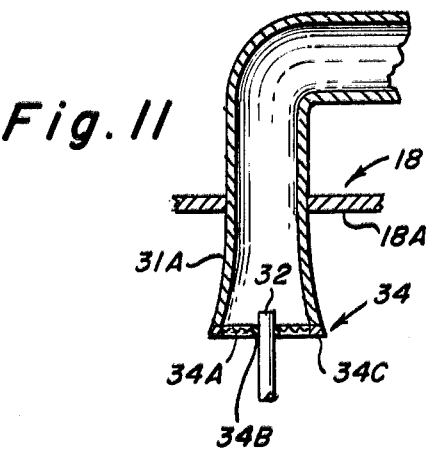

CENTRIFUGAL, MAGNETIC AND SCREENING SEPARATOR

BACKGROUND OF THE INVENTION

1. Field of the Invention

This invention relates to a centrifugal, magnetic and screening separator for use in purifying a liquid by separating undesired solid adulterating matter, components or constituents, heavier or more dense than the liquid, but carried by the liquid therefrom.

By way of example only, the liquid may be lubricating oil, a hydraulic fluid, such as used in vehicular power steering, transmission, or brake systems, or other hydraulic systems, or metal working fluids. The heavier or more dense adulterating matter, components or constituents that this separator is intended to separate from the liquid passing therethrough are solid contaminants including metallic and non-metalic particles and flakes. The metal particles and flakes may be magnetically attractable, or they may not.

2. Description of the Prior Art

Separators of the centrifugal type for separating the heavier or more dense components including contaminants such as solid particles from a liquid in which the fluid is passed through a spirally or helically wound conduit having apertures therein through which the heavier components of the fluid pass outwardly, under the influence of centrifugal force, into a receiving chamber within a housing are known in the prior art as shown by U.S. Pat. Nos. 3,706,383; 3,768,658; 3,875,061; and 3,951,813 all of which were issued to James R. Palma. In all of the Palma patents just enumerated, means is provided for rotating the spiral conduit through which the fluid passes.

U.S. Pat. No. 3,875,061—Palma, which is included in the list of patents just enumerated, shows the additional feature that magnetic means is provided contiguous the discharge apertures of the spirally wound conduit to magnetically attract and retain any magnetic or magnetizable metallic particles such as ferrous particles which may be centrifugally discharged through the apertures of the spiral conduit.

U.S. Pat. No. 3,346,117 to Charles B. Page, Jr., discloses a de-emulsifying apparatus for separating two fluids such as oil and water which comprises a non-rotating spirally wound coil having a relatively short radius of curvature to cause fluids flowing through the conduit to be subjected to centrifugal force such force tending to separate the heavier constituents of the fluid from the lighter constituents thereof.

U.S. Pat. No. 1,768,550 issued to Stephen I. Fekete and U.S. Pat. No. 3,528,552 issued to Albert E. Martin both relate to apparatus for removing deleterious particles from a liquid in which the liquid having the particles therein is directed into a conical chamber in such manner as to have a centrifugal flow characteristic in the conical chamber which causes the deleterious particles to be thrown outwardly whereby to cause any ferrous or other magnetic or magnetizable particles to move into proximity to a magnetic means which attracts and retains such particles.

German Pat. No. 1,160,130 discloses a centrifugal separator comprising a non-rotating spiral conduit having apertures therein through which the heavier or denser constituents in a fluid are centrifugally ejected, and further including magnet means positioned contiguous the discharge path of material ejected through the apertures for attracting and retaining magnetic particles in the discharged material.

Russian patent document No. SU-581994 discloses a non-rotating helically-wound tubular conduit for separating magnetic fractions from a stream of ground mineral ore in which the helically-wound conduit is provided with aperture means through which the magnetic fraction passes outwardly of the conduit under the influence of a magnet means whereby to separate the magnetic particles from the rest of the mineral ore.

U.S. Pat. No. 1,606,356—Fisher, shows a liquid purification apparatus for use in a fuel feed system for an internal combustion engine in which the liquid purification apparatus comprises a chamber through which the fuel passes on its way to the carburetor of the internal combustion engine, with a screen being positioned in the upper end of the chamber to screen out deleterious particles before they pass to the carburetor.

Russian patent document No. SU-284,968 discloses a single loop centrifugal separator in which solids may exit from a liquid or gas under the influence of centrifugal force by way of a funnel-like outlet located in a mid-section of such loop adjacent a flow divider.

Russian patent document No. SU-561,573 discloses electromagnetic means for causing magnetically attractable particles to move toward the wall of a separator which the electromagnetic means surrounds.

Throughout the specification and claims, the term "magnetic particles" is used to designate particles which are capable of being magnetically attracted to a magnet, such as ferrous particles which are magnetizable or, alternatively, which are already magnetized.

STATEMENT OF THE INVENTION

It is an object of the present invention to provide an improved apparatus for separating solid contaminants from a liquid by centrifugal action without requiring the use of any moving parts, and in which the separation is accomplished merely by passing the solids-including liquid through a non-rotating spirally or helically-wound conduit having apertures therein through which the solids in the liquid small enough to pass through the apertures are thrown outwardly from the spiral conduit through the apertures into a receiving chamber formed in the separator.

Further, the liquid and solids passing into the chamber through the apertures are kept in constant motion, and cleansed liquid is forced out of the chamber and then out of the separator due to the displacement of additional solids, if any, and liquid exiting the apertures due to centrifugal force.

It is another object of the invention to provide an improved centrifugal separating structure in a separating apparatus for separating both magnetically attractable and non-magnetically attractable solid contaminants from a liquid, the apparatus further including magnetic means for attracting and retaining magnetically attractable particles which are centrifugally ejected through apertures in the centrifugal separating structure, and a screen for separating non-magnetically attractable solid which are centrifugally ejected through such apertures.

It is a further object of the invention to provide a separator apparatus which can be easily assembled and disassembled to facilitate the repair and/or cleaning of the apparatus, and particularly the magnets, screen and separation apertures thereof.

It is a further object of the invention to provide a separator apparatus or assembly comprising two subassemblies including a first subassembly which is normally secured to static supporting structure such as a portion of an automotive vehicle structure, for example, and a second subassembly which is easily connectible to or disconnectible from the first subassembly, the first subassembly including the top cover member for the assembly which carries a return fitting and which also supports a non-rotatable spirally or helically-wound conduit member through which liquid to be separated from possible solid contaminants therein passes; while the second subassembly comprises a housing for the spirally wound conduit, together with a magnetic structure or magnetic means which attracts magnetic particles which are centrifugally ejected through apertures in the spiral conduit, the second subassembly including a detachable bottom cover member as part of the housing. The top cover or the return fitting of the first subassembly further supports a separating screen when the separator is in its use condition.

BRIEF SUMMARY OF INVENTION

In achievement of these objectives, there is provided in accordance with the invention an apparatus for separating from a liquid solid contaminants, such as solid particles entrained in the liquid, said apparatus comprising a housing, said housing having a hollow member defining a chamber, and a top cover detachably mounted on the normally upper end of said hollow member, a liquid conduit including a helically or spirally wound portion, said liquid conduit including a tubular inlet portion carried by and extending through said top cover, and connected to one end of said spirally wound portion, said tubular conduit including a tubular discharge portion extending into an aperture in said top cover and connected to the opposite end of said spirally wound portion, whereby said tubular conduit including said spirally wound portion and said tubular inlet and outlet portions are supported by said top cover and together with said top cover are separable as a unit from the rest of said apparatus, said spirally wound portion being received in said chamber of said housing when said top cover is mounted on said normally upper end of said body member, said spirally wound portion of said tubular conduit including aperture means in radially outer wall portions of the spiral turns thereof whereby said solid liquid carried containments, such as solid particles, passing through said spirally wound portion are ejected through said aperture means by centrifugal force, magnet means supported in said chamber contiguous to said apertures of said spirally wound portion of said liquid conduit, whereby magnetic particles ejected through said aperture means are attracted to and retained by said magnet means, and means connected to the normally lower end of said body member and defining the bottom closure of said housing.

The top cover further carries a cleansed fluid return fitting which communicates with the interior of the housing and surrounds the upper open end of the tubular discharge portion above a separating screen. This screen is supported, when the separator is in use, either by the top cover, or by the return fitting, as will be further described. The tubular discharge portion passes through the screen, in a manner also to be further described.

Further features include providing means whereby the bottom closure for the housing is detachable, and mounting the magnet means on the bottom closure, whereby the magnet means and the bottom closure are detachable together from the housing for cleaning or repair.

A still further and alternate feature includes aspirating means formed by a belled inlet provide on the cleansed liquid return fitting and the upper end of the tubular discharge portion for accelerating cleansed liquid flow through the screen and into the return fitting. When the belled inlet is used, the screen is carried by the bottom thereof and the upper end of the tubular discharge portion passes through the screen.

Further objects and advantages of the invention will become apparent from the following description taken in conjunction with the accompanying drawings.

BRIEF DESCRIPTION OF THE DRAWINGS

FIG. 1 is a top plan view of the separator of the invention;

FIG. 2 is a view in partial vertical section taken substantially along line 2—2 of FIG. 1, with certain parts being shown in full;

FIG. 3 is a view in transverse section taken along line 3—3 of FIG. 2 showing one form the particle separation apertures in the spiral conduit can take;

FIG. 4 is a fragmentary view in vertical section similar to the lower right-hand portion of FIG. 2 but showing a modified arrangement in schematic form in which electromagnetic means instead of permanent magnet means are used to provide the magnetic attraction for magnetic particles ejected from the spirally wound portion of the tubular centrifugal separating conduit;

FIG. 5 and FIG. 6 considered together show the separator apparatus of the invention partly disassembled with FIG. 5 showing the first and normally upper subassembly comprising the top cover, the screen member, and the spirally-wound centrifugal conduit; and FIG. 6 showing the second and normally lower subassembly which comprises the cylindrical housing, the magnetic structure and its supporting yoke and the bottom cover member of the apparatus of FIGS. 1 and 2.

FIG. 7 is an enlarged view in section of a portion of the spirally-wound conduit of the apparatus of FIGS. 1 and 2 showing another form the separation apertures through the wound conduit can take in which the apertures are substantially tangential to the direction of liquid flow through the conduit;

FIG. 8 is a view of a portion of the spirally wound conduit of the apparatus of FIGS. 1 and 2 showing another form the separating apertures in the wall of the conduit can take. These apertures are positioned with their axes in substantially perpendicular relation to the outer surface of the conduit wall and to the direction of major liquid flow at any given aperture location;

FIG. 9 is a view of another separation aperture embodiment showing a modified portion of the spirally-wound conduit in which the aperture is of substantially truncated cone-shape in longitudinal section, wherein the diameter of the aperture decreases as it extends outwardly from the adjacent conduit wall;

FIG. 10 is an enlarged view of the form of separation apertures seen in FIGS. 1, 3, and 5; and FIG. 11 is a view of a modified type of cleansed liquid return fitting extending through the top cover of the separator apparatus.

This cleansed liquid return fitting has a belled inlet end disposed above and supporting the screen. The inlet of the return fitting is in communication, through the screen with the interior of the separator housing so as to receive for recirculation liquid discharged from the apertures of the wound conduit and from the discharge end of the tubular conduit, as well as any solid components carried by such liquid which are not attracted by the magnetic means and are too minute to be blocked by the screen.

DESCRIPTION OF THE PREFERRED EMBODIMENT

Referring now to the drawings, and more particularly to FIGS. 1-6, inclusive, there is shown centrifugal, magnetic and screening separator generally indicated at 10, comprising a lower subassembly generally indicated at 10B including a bottom cover member, designated generally as 14, which supports a yoke, designated generally as 41, on which magnets 46 are mounted, and a hollow tubular housing member 16. An upper subassembly designated generally by 10A comprises a top cover member, generally indicated at 18, which is detachably secured to the upper end of member 16, a tubular conduit, designated generally by 28, preferably formed of non-magnetic material such as plastic or copper, carried by top cover member 18, and including a spirally wound conduit portion 29, a return fitting fastened in an aperture 27 in the top cover member 18, and a screen assembly designated generally as 34, carried either by the top cover member 18, or, alternately by the lower and of fitting 31, as will be further described. Elements 14, 16 and 18 are also preferably made of a non-magnetic metal, such as aluminum, or of plastic, for a reason to be described.

As best seen in the assembled view of FIG. 2, bottom cover 14 comprises a flat planar circular bottom portion 14A having flat upper and lower surfaces and a circular flange portion 14B which extends perpendicularly to bottom portion 14A. Flange portion 14B of bottom cover 14 is provided with an internal screw thread 20 which is adapted to threadedly engage an external screw thread 22 on the lower end of housing member 16, whereby cover 14 and additional structure to be described carried thereby may be removed from housing member 16.

Similarly top cover 18 includes a top planar portion 18A which is apertured, at 13 to receive therethrough, in a tight no-leak manner, the inlet end 30 of tubular conduit 28. Inlet end 30 is removably coupled to a take-off 9 of an installed liquid-handling system, not further shown, on a vehicle, machine tool, or other machine, by a union-type coupling shown schematically at 17. End 30 is the avenue by which the liquid from the installed system enters the separator to be cleansed. Planar portion 18A of cover 18 is also apertured, at 27 as previously noted, to receive the inlet end of return fitting 31 through which cleansed liquid discharges from the separator apparatus, as will be described in more detail hereinafter for return, by further conduit means 23, to the installed liquid-handling system. Fitting 31 may be permanently bonded, in a no-leak manner in aperture 27, or cooperating threads can be provided on 27 and 31 so that 31 can be detached if desired. Return fitting 31 is removably coupled to conduit means 23 by a union-type coupling shown schematically at 25 in FIG. 2 only so to not complicate FIGS. 1 and 5 unnecessarily.

Top cover member 18 further includes a downwardly depending circular flange 18B having internal screw threads 24 which are adapted to threadedly engage external screw threads 26 on the outer surface of the upper end of housing member 16. A screen assembly, designated generally as 34, to be further described, surrounds the upper end of a tubular discharge portion 32, and is supported either by being fastened to the bottom of portion 18A, as shown in FIG. 5, or to the bottom of fitting 31, as alternate embodiments in FIGS. 2 and 11. The top cover member 18 also rigidly carries means, such as the apertured mounting ear 11 whereby my separator can be fastened, by screws, or the like, now shown, to a vehicle, or machine tool, or some other machine, or implement with which the separator is to be used.

The tubular fluid conduit generally indicated at 28 is supported by top cover member 18, since portion 30 is rigidly fastened in aperture 13, and includes a spirally wound conduit portion 29 including in the illustrated embodiment, a plurality of serially connected, vertically superposed spiral turns each having a relatively short radius of curvature and respectively indicated at 29A, 29B, 29C, 29D, 29E, 29F and 29G; spiral turn 29A being the uppermost of the vertically superposed turns while turn 29G is the lowermost of the superposed turns. The uppermost spiral turn 29A is integral and in fluid communication with vertically extending inlet end portion 30, whereas the lowermost spiral turn 29G is integral and in fluid communication with tubular discharge portion 32 which extends from turn 29G downwardly and then rearwardly to join an upwardly extending run outboard of the outer peripheries of the plurality of vertically superposed spiral turns where it terminates within fitting 31, as seen in FIGS. 1 and 5, or 31A as shown in FIG. 11.

One or more of the spiral turns 29A-29G inclusive, and preferably each of such spiral turns of spiral conduit portion 29 is provided with one or more apertures 39 in the outer wall surface thereof through which solid containments, such as solid particles in the liquid may be ejected into chamber 15 due to the centrifugal force imparted to them as the liquid carrying them flows through spiral conduit portion 29. The apertures 39 may assume various shapes and forms, as best seen in the views of FIGS. 7, 8, 9, and 10.

There is shown in the fragmented view of FIG. 7 an aperture 39A which is cut at an angle through the outer wall of a portion of the spirally wound portion 29 of the tubular conduit 28 in such a direction that the longitudinal axis of the aperture in the outer wall of the tubular conduit is substantially tangential to the direction of flow of the liquid through the tubular conduit.

In the embodiment shown in the fragmentary view of FIG. 8, a plurality of apertures, each indicated at 39B, are provided in the outer wall of the spirally wound portion 29 of the tubular conduit 28, each aperture 39B being formed in the outer wall so that it lies substantially perpendicular to the direction of major liquid flow through the conduit at the location of the respective aperture.

There is shown in the fragmented view of FIG. 9 a still further modified form of aperture indicated at 39C in which the aperture is of tapered or truncated conical shape, with the conical taper of the aperture 39C diminishing in a radially outward direction relative to the outer wall of the spirally wound portion 29 of the tubular conduit 28.

FIG. 10 shows an enlargement of another form of aperture, namely the apertures 39 shown in FIGS. 2, 3, and 5 wherein angular cut-outs are made in various locations in the outer wall of the spirally wound portion 29.

Screen assembly 34 whether utilized as shown in FIGS. 2, or 5 or 11, consists of the same components, namely a centrally apertured, circular screening element 34A, an apertured rubber, or similar sealing element 34B concentric to and molded about such central aperture in such manner that the screening wires are molded into the sealing element, and a multi-apertured rim portion 34C of rubber, or the like, molded about the outer periphery of element 34A and interlocked with the marginal wires so as to form a peripheral seal. Small screws, 34D, the heads of which only are seen in FIG. 5, by way of example and which would also be used with the structures of FIGS. 2 and 11, but which are not shown in FIGS. 2 or 11, pass through the several apertures, not shown, in rim 34C and engage in tapped holes, not shown, provided in either the return fitting 31 of FIG. 2, or the belled return fitting 31A of FIG. 11, or in the bottom of wall 18A in FIG. 5. When the heads of screws 34D are tightened against rim 34C such rim forms a seal, as also does element 34B relative to discharge portion 32 so that liquid exiting chamber 15, other than that exiting through portion 32, must pass through screening element 34A, whereas solid particles in such liquid in chamber 15 larger than the openings in screening 34A are blocked by screening 34A and are retained in chamber 15.

Aperture 27 in top cover 18, it will be noted, is eccentrically located relative to cover 18 whereby the vertical portion of return fitting 31 surrounds the free end of the discharge portion 32 of conduit 28.

As can best be seen in the view of FIG. 5, top cover member 18, screen assembly 34, and conduit 28 including the spirally wound portion 29 thereof and the inlet and discharge conduit portions 30, 32 thereof, constitute a separate subassembly generally indicated at 10A which in the installation of separator apparatus 10 may be secured in a fixed position relative to the automotive vehicle or other apparatus with which fluid separator apparatus 10 is associated by means of mounting ear 11, previously described.

An important aspect of the construction of the separator apparatus 10 is the provision of a magnet and yoke-including subassembly generally indicated at 40 which will now be described. Subassembly 40 cooperates with spiral portion 29 of liquid conveying conduit 28 to attract and retain magnetic particles, flakes, bits or pieces which are ejected through any selected one of the aperture types 39 through 39C of spiral conduit portion 29 due to the centrifugal force imported to the liquid passing through such spiral conduit portion.

Subassembly 40 comprises a yoke member of non-magnetic material generally indicated at 41 which is positioned in the lower subassembly 10B, comprising tubular housing member 16 and detachable bottom cover member 14. Yoke 41 includes a normally horizontal planar base portion 42 which is secured to bottom portion 14A of bottom cover 14 by welding or bonding, or the like, not shown. Base portion 42 of yoke 41 may have a circular area substantially coextensive with the upper bottom portion 14A of cover 14. Yoke 41 also includes a pair of diametrically opposite vertically upstanding leg members each indicated at 44 which, as illustrated, have a vertical height somewhat higher than the level of the upper surface of the topmost spiral turn 29A of spiral portion 29 of liquid conduit 28. Each of the yoke's vertical leg members 44 is of arcuate contour extending in a direction circumferentially of the inner circumference of housing member 16. Each of the yoke legs 44 as illustrated embodiment has an angular extent of substantially 90° of the periphery of the interior circumference of housing member 16 although this extent can be somewhat more or less if desired. The outer surface of each of the respective yoke legs 44 is such that such surface of each yoke leg is very close to the inner peripheral surface of housing member 16. However, the radial spacing between the radially outer surface of each arcuate yoke leg 44 and the inner peripheral surface of housing member 16 should be such as to permit easy removal, in a direction axially downward of housing member 16, of the subassembly 40, comprising yoke 41 and the magnets secured thereto, to be described, coincidentally with bottom cover member 14 to which subassembly 40 is secured.

A separate permanent magnet member, each respectively indicated at 46, is suitably secured to each of the respective yoke legs 44. Each of the permanent magnets 46 is of arcuate contour and extends peripherally of the interior of housing 12 for substantially the same angular or arcuate extent as the corresponding yoke leg 44 on which it is mounted. In the illustrated embodiment each of the respective arcuate permanent magnet members 46 extends for a vertical distance, as seen in FIG. 2 at least sufficient to span the vertical height of spiral conduit portion 29 of the tubular conduit 28. Each of the magnets 46 may be substantially magnetically independent of the other permanent magnet 46, if yoke member 41, which mechanically supports the oppositely disposed permanent magnet members 46, is of non-magnetic material whereby yoke 41 does not provide a magnetic path between the two diametrically opposed permanent 46. Or if desired member 41 may be formed of magnetic material whereby a magnetic path is established between magnets 46.

There is diagramatically shown in the fragmentary view of FIG. 4 a modified arrangement showing the use of an electromagnet rather than a permanent magnet, for attracting the ferrous or magnetic particles in the material discharged through apertures 39 of spiral conduit 29. The structure of the modified embodiment of FIG. 4 is somewhat similar to that shown in the embodiment of FIG. 2 and includes a non-magnetic or magnetic yoke structure 41 similar to that described in connection with the embodiment of FIG. 2, and an annular spool-like, soft iron core 147 around which is helically wound wire coil 148. Core 147 and coil 148 comprise an electromagnet, generally indicated at 140 supported in a suitable manner by the yoke structure 41 in a fashion similar to the mounting arrangement for the magnets 46 shown and described in connection with the embodiment of FIG. 2. Wound coil 148 is connectable by way of switch 149, and wires 150 and 151, when desired, to a source of direct current electrical energy, whereby when winding 148 is electrically energized, core 147 is magnetized and attracts magnetic or ferrous particles discharged through the apertures 39 of spiral conduit portion 29 in a manner similar to that previously described in connection with magnets 46 in the embodiment of FIG. 2. Wires 150 and 151 pass from the exterior of separator 10 to join opposite ends of coil 148 by way of small channels provided through elements 14A, 42 and 44 in which channels such wires are sealed in a leak-proof manner.

In the fragmentary view of FIG. 11 there is shown another arrangement of the relationship between the return fitting, the tubular discharge portion, and the top cover. In this modified embodiment of FIG. 11, return fitting 31A is provided with a downwardly and outwardly flared bell mouth which projects well below the top wall 18A of top cover 18. The free upper end of the discharge conduit portion 32 of the tubular conduit 28 extends upwardly into the bell mouth in a manner generally similar to the relationship of the vertical discharge conduit portion 32 to the return fitting 31 in the embodiment of FIG. 2. The bell mouth at the bottom of return fitting 31A carries a screen assembly 34 in the same manner as shown in FIG. 2: i.e., the screen assembly 34 is supported at its sealing rim 34C by the horizontal bottom of fitting 31A. Liquid exiting through discharge portion 32, in conjunction with the bell mouth of return fitting 31A, provides an aspirating effect which promotes flow of liquid from chamber 15, through screening element 34A into return fitting 31A for discharge from the separator.

Assuming that my separator 10 is assembled and that top cover member 18 is fixed, by means of ear 11 to a stationary part of a machine, such as an automotive vehicle with which the separator is to be used, housing subassembly 10B, comprising housing member 16, magnet and yoke-including subassembly 40, means together with the bottom cover member 14, may be detached from upper subassembly 10A which comprises top cover 18, return fitting 31, screen assembly 34, and fluid conduit 28, by unscrewing lower subassembly 10B from upper subassembly 10A by rotating member 16 to unscrew the external screw threads 26 at the upper end of member 16 from the internal screw threads 24 of top cover member 18. When this is done, upper housing subassembly 10A as seen in FIG. 5 will remain attached to the stationary part of the apparatus with which the fluid separator is being used. Furthermore, when lower subassembly 10B, as seen in FIG. 6, has been disconnected from upper subassembly 10A, as seen in FIG. 5, bottom cover member 14 may then be unscrewed from its screw threaded connection relative to the lower end of member 16, and, when this is done, bottom cover member 14 carries with it the attached subassembly 40 comprising yoke 41 and magnets 46 carried by yoke 41. Thus, bottom cover member 14, yoke 41, and magnets 46 carried by bottom cover member 14 define still another separate subassembly when detached from member 16.

It can be seen that the easily detachable relationship of the upper and lower subassemblies 10A and 10B relative to each other as best seen in the views of FIGS. 5 and 6, and, further that the easily detachable relationship of the subassembly comprising bottom cover member 14 and the yoke and magnet structure which are attached to bottom cover 14, greatly facilitate cleaning and/or repair of the separating apparatus of the invention. Flow of liquid through the separator is, of course, terminated before any disassembly is begun, and such flow is not again started until the separator is again assembled and in condition for further use.

It will be understood that the assembly and/or disassembly of the upper and lower subassemblies 10B and 10A relative to each other, and also of the bottom cover and yoke and magnet structure relative to member 16 is substantially the same as that just described when the apparatus includes the modified magnetizing arrangement shown in FIG. 4.

DESCRIPTION OF OPERATION

My separator apparatus is assembled as shown in FIGS. 1 and 2 with the upper subassembly 10A shown in FIG. 5 being suitably secured by means of ear 11 to part of a structure, such as the chassis of an automotive vehicle with which the separator is to be used. The inlet end of tubular conduit 28 which projects above top cover member 18, as shown in FIG. 5, is connected by way of union 17 and off-take 9 into a liquid circuit the liquid of which is to pass through the separator apparatus for cleaning. The circuit or system in which the separator is connected may be part of the lubrication, braking, or power steering system of the vehicle, for example.

The liquid to be cleaned flows at the pressure prevailing in off-take 9 into the inlet end 30 and thence through the stationary spiral portion 29 of tubular conduit 28, including spiral turns 29A-29G, inclusive. As the liquid passes through the spiral 29 of the tubular conduit 28, the liquid has a centrifugal force imparted thereto to cause any solid contaminants in the liquid such as solid particles, flakes, bits, or pieces to be thrown toward the radially outer wall of the tubular conduit. Some of these solid contaminants carried by the liquid, if they are small enough, will be ejected or pass outwardly along with some of the liquid being cleaned through the apertures indicated at 39 in FIGS. 2 and 3; the apertures 39A shown in the embodiment of FIG. 7; the apertures 39B shown in FIG. 8; or the apertures such as 39C shown in the embodiment of FIG. 9, depending upon which aperture type is used in a specific situation, into chamber 15. Furthermore, any ferrous or magnetic particles which are ejected through the apertures 39, 39A, 39B or 39C, due to centrifugal action, are attracted by and retained by the permanent magnets 46 shown in FIGS. 2, 3, and 6, or by the electromagnet 140 shown in the modified embodiment of FIG. 4, as the case may be, until the separator is disassembled, as previously described, and cleaned. Any non-magnetic particles which pass through the apertures 39, 39A, 39B, or 39C in the spiral portion of conduit 28, will not be attracted to the magnet members 46, or the electromagnet 140, and will eventually fall by gravity to the lower portion of the chamber 15 within member 16, and come to rest on the top of base portion 42 from whence such particles can be removed by disassembling the separator, as previously described, and cleaning same.

Since the separation process, whence once begun, is normally continuous until terminated, the liquid being cleaned, when the separator is in operation, will be fed continuously into spiral conduit 29, from whence some of such liquid and some solids of small enough size, if present, will exit, on each pass of the liquid through the conduit 29 by way of apertures 39A, 39B, 39C or 39. The remaining liquid, on a given pass of the liquid through the separator, which does not exit through apertures 39A, 39B, 39C or 39 and which may, or may not still carry solid contaminants will continue through conduit 29, into and then out of tubular discharge 32; into return fitting 31 and then back to the liquid circuit or system from which it was originally taken for recirculation through such circuit or system, by the circuit's or system's pump, not shown, and eventually back through the separator 10. The portion of the liquid which exits through any of the apertures 39, 39A, 39B, or 39C also eventually finds its way back to the circuit or system from which it was originally taken because it passes from the interior of member 16, under the impetus of displacement by additional solids, if any, and liquid exiting apertures 39, 39A, 39B, or 39C, through screen assembly 34 and into return fitting 31 where it merges with liquid exiting discharge 32 for return to the liquid circuit from which it was taken. Since the mesh of screening element 34A can be selected to block any solids larger than a given size, but small enough to pass through apertures 39, 39A, 39B or 39C from exiting chamber 15, any magnetizable particles greater than such size which are not initially attracted to and held by the permanent magnets, or the electromagnet, depending on which is being utilized in a given device, will, if the device is properly maintained to prevent complete loading of the magnets to the full extent of their holding power, eventually become attracted to the magnets due to the continued motion of the liquid body within member 16 whenever the device is being used. As noted previously, any non-magnetic solids which enter chamber 15 within 16, and which are too large to pass through screen 34 are retained in the liquid in chamber 15 and will eventually drop by gravity toward the bottom of chamber 15 on top of portion 24. The same is true for magnetic solids if the magnets become fully loaded. The solid contaminants which remain in chamber 15, including the magnetic solids which have been attracted to and retained by magnets 46 or electromagnet 140 may be periodically removed from the apparatus when the housing is disassembled into its component housing portions 10A, 10B, as previously explained, which disassembly may or may not include detaching bottom cover 14 and the attached yoke and magnet subassembly 40, or 140, depending on which is being used in a particular device, from member 16 to further facilitate the cleaning operation.

It is intended that, when threads 20 and 22 are fully connected, a leak proof joint will be formed. The same also applies when threads 24 and 26 are fully connected. Of course, seal means can also be used with the two threaded joints just discussed if such is found to be desirable.

Should it be desired to remove the screen assembly 34 of any of the embodiments of FIGS. 2, 5 or 11 for cleaning, repair, or replacement, such removal can be accomplished by first separating subassemblies 10A and 10B, then removing screws 34D and finally biasing the top end of portion 32 down out of the aperture in sealing element 34B. Such biasing of 32 is possible because of the spring-like formation of the spirally wound portion 29 of conduit 28.

Elements 14, 16 and 18, as previously noted are preferably constructed of non-magnetic metal, or plastic material so that magnetic particles will not be attracted to or deposit thereon thus making cleaning of the separator when necessary, less arduous. If plastic material is used for elements 14, 16 and 18, it is desirable to use transparent plastic so that the internal condition of the separator can be checked without disassembling same.

The separator set forth herein can be inserted either directly in the flow line of the installed fluid handling system with which it is used, that is, in series with other components of such system, or in parallel with such system. Thus off-take 9 and conduit means 23 are intended to illustrate either hook-up. Since portion 32 discharges directly into return fitting 31 above screen assembly 34, liquid will continue to flow through the separator, albeit without any cleansing thereof taking place, even if all of the apertures 39, or 39A, or 39B, or 39C chosen for use in a particular separator embodiment became clogged, thus preventing possible liquid 37 starving" of the installed system, particularly when the separator is used directly in the flow line, as mentioned above.

Although the separator has been described hereinabove for use in removing solid contaminants from a liquid, its usefulness is not solely limited to liquid cleansing since it can also be used without alteration, and in the same manner as described to remove solid contaminants from other fluids, including air, steam, and other gaseous or gas-like fluids. For example, my separator is capable of use in removing solid contaminants from pressuried air by being connected into the output line of an air compressor. Thus the claims which follow are intended to cover use of the illustrated device for cleansing both liquid, gaseous and gas-like fluids.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. An apparatus for separating solid contaminants including magnetic particles from a flowing fluid comprising means capable of existing in three distinct modes, namely, a normal operating mode, a clogged mode, and a down for cleaning and/or repair mode consisting of: a housing for holding fluid, said housing including a tubular housing member defining a hollow chamber in said housing, a top cover member carrying a fluid return fitting mounted on the normally upper end of said tubular housing member, means connected to the normally lower end of said tubular member providing a bottom closure for said housing, and means providing for detachment of at least one of said top cover member or said bottom closure from said tubular housing member, a tubular fluid-conveying conduit including a spirally wound portion, located in said chamber at least during said normal operating and clogged modes, said tubular fluid-conveying conduit including a tubular inlet portion carried by and extending through said top cover member and connected to one end of said spirally wound portion, said tubular conduit including a tubular discharge portion connected to and extending upwardly from the opposite end of said spirally wound portion, whereby said tubular conduit including said spirally wound portion and said tubular inlet and discharge portions are supported by said top cover member, said spirally wound portion of said tubular conduit including aperture means in a radially outer wall portion of a spiral turn thereof, magnet means supported in said hollow chamber contiguous said aperture means of said spirally wound portion of said fluid-conveying conduit, and screening means carried by and within said apparatus near the upper end thereof; said apparatus when existing in its normal operating mode being adapted to receive fluid contaminated with solids, from a system in which it is desired to purify said fluid, by way of said inlet portion from whence said fluid passes on to said aperture-including spiral portion whereby at least some of said solid contaminants carried by said flowing fluid passing through said spiral portion on a given pass of said flowing fluid through said apparatus, if sufficiently small, are ejected, along with a portion of said flowing fluid, through said aperture means by centrifugal force such that any ejected magnetic particles are subject to capture by said magnet means whereas any solid contaminants not captured by said magnetic means either drift to the bottom of said apparatus under the influence of gravity or pass with said fluid portion toward said screening means whereat those solid contaminants too large to pass through said screening means are blocked by said screening means and said fluid portion continues through said screening means and rejoins the remainder of said flowing fluid, other than said portion of said flowing fluid on said given pass, downstream of said screening means for exit from said apparatus to said system by way of said return fitting, said flowing fluid portion after ejection through said aperture means being kept in continuous motion in said housing while progressing adjacent said magnetic means and while progressing to and through said screening means and out said return fitting by displacement of additional flowing fluid exiting said aperture means, whereby fluid suspended magnetic particles downstream of said aperture means and upstream of the screening means but adjacent said magnetic means are kept in motion thereby improving the probability of their eventual if not immediate capture by said magnetic means, said apparatus when existing in its clogged mode having one of said aperture means or screening means clogged to the extent that said system would be subject to starvation except for a continuing flow of system fluid through said spirally wound portion and said tubular discharge portion which continuing flow exits said discharge portion downstream of said screening means then exits said apparatus for return to said system by way of said return fitting, said apparatus when existing in said down for cleaning and/or repair mode being adapted to have at least one of the top cover member and said portions carried thereby, or means including the bottom closure detached from said tubular housing member whereby internal portions of said apparatus may be made accessible for cleaning and/or repair.

2. An apparatus as defined in claim 1 said magnet means comprising at least one permanent magnet.

3. An apparatus as defined in claim 1 said magnet means comprising an electromagnet.

4. An apparatus as defined in claim 1 in which said top cover member is detachably connected to said tubular housing member.

5. An apparatus as defined in claim 1 in which said bottom closure is a bottom cover member, and said magnet means is mounted on and fastened to said bottom cover member, and is detachably connected to said bottom cover member from its connection to said tubular housing member.

6. An apparatus as defined in claim 5, said magnet means comprising at least one permanent magnet.

7. An apparatus as defined in claim 5, said magnet means comprising an electromagnet.

8. An apparatus as defined in claim 1 in which said return fitting has a downwardly and radially outwardly flared bell mouth which projects downwardly beneath said top cover member into said chamber to produce, in conjunction with fluid discharging from said tubular discharge portion, which tubular discharge portion terminates within said bell mouth, an aspirating effect which promotes the flow of fluid exiting from said chamber through said screening means and into said return fitting.

9. An apparatus as defined in claim 1, said screening means being supported within said housing near the upper end thereof and surrounding the tubular discharge portion in such manner that fluid discharging from said tubular discharge portion may pass directly to said return fitting without passing through said screening means.

10. An apparatus as defined in claim 1, said screening means being so related to said apparatus that when said apparatus is existing in said normal mode no fluid exiting said aperture means can reach said return fitting without passing through said screening means.

11. An apparatus defined in claim 1, said screening means being sealingly engaged with and carried by one of said top cover member or said return fitting.

* * * * *